United States Patent
Flynn et al.

(10) Patent No.: US 10,030,957 B2
(45) Date of Patent: Jul. 24, 2018

(54) METHOD AND APPARATUS FOR CHARACTERISING FRAGMENTATION OF AN EXPLOSIVE DEVICE

(71) Applicant: BAE SYSTEMS plc, London (GB)

(72) Inventors: Dennis Joseph Flynn, Monmouthshire (GB); Huw Battenbo, Monmouthshire (GB)

(73) Assignee: BAE SYSTEMS plc, London (GB)

(*) Notice: Subject to any disclaimer, the term of this patent is extended or adjusted under 35 U.S.C. 154(b) by 55 days.

(21) Appl. No.: 15/022,818

(22) PCT Filed: Sep. 16, 2014

(86) PCT No.: PCT/GB2014/052797
§ 371 (c)(1),
(2) Date: Mar. 17, 2016

(87) PCT Pub. No.: WO2015/040372
PCT Pub. Date: Mar. 26, 2015

(65) Prior Publication Data
US 2016/0282098 A1 Sep. 29, 2016

(30) Foreign Application Priority Data

Sep. 17, 2013 (EP) .................................... 13275221
Sep. 17, 2013 (GB) .................................... 1316508.9

(51) Int. Cl.
*G06K 9/62* (2006.01)
*F42B 35/00* (2006.01)

(52) U.S. Cl.
CPC ............ *F42B 35/00* (2013.01); *G06K 9/6267* (2013.01)

(58) Field of Classification Search
CPC .............................. F42B 35/00; G06K 9/6267
See application file for complete search history.

(56) References Cited

U.S. PATENT DOCUMENTS

| | | |
|---|---|---|
| 3,771,620 A | 11/1973 | Lockwood |
| 4,334,423 A | 6/1982 | Rainis et al. |
| 5,386,778 A | 2/1995 | Sullivan, Jr. |
| 7,334,466 B1 | 2/2008 | Brislin |
| 7,614,348 B2 * | 11/2009 | Truitt ...................... F42B 12/32 |
| | | 102/491 |

(Continued)

FOREIGN PATENT DOCUMENTS

| | | |
|---|---|---|
| DE | 102008020715 A1 | 12/2009 |
| WO | 2015040372 A1 | 3/2015 |

OTHER PUBLICATIONS

International Search Report and Written Opinion received for Patent Application No. PCT/GB2014/052797, dated Nov. 13, 2014. 9 pages.

(Continued)

*Primary Examiner* — Gregory M Desire
(74) *Attorney, Agent, or Firm* — Finch & Maloney PLLC

(57) ABSTRACT

A method of characterizing fragmentation of an explosive device (110) comprises receiving a image of a witness plate (100) that has been subject to impact by fragments from explosion of the device; warping the image to remove deformations of the plate (100); marking strike damage sites (120) caused by impact of the fragments; and recording the position and area of the strike damage sites (120).

20 Claims, 4 Drawing Sheets

(56) References Cited

U.S. PATENT DOCUMENTS

| | | | | |
|---|---|---|---|---|
| 8,539,847 B1* | 9/2013 | Sturdivant | ............... | F42B 35/00 |
| | | | | 73/864.51 |
| 9,177,368 B2* | 11/2015 | Cabral | ................... | G06T 5/006 |
| 2005/0248560 A1* | 11/2005 | Agrawala | ............... | G06T 19/00 |
| | | | | 345/418 |
| 2010/0024633 A1* | 2/2010 | Piscitelli | ................ | F41H 7/044 |
| | | | | 89/36.02 |
| 2010/0059696 A1* | 3/2010 | Heintzmann | ...... | G02B 21/0056 |
| | | | | 250/550 |
| 2012/0090454 A1* | 4/2012 | Treadway | ............... | F41H 5/023 |
| | | | | 89/36.02 |
| 2013/0114787 A1* | 5/2013 | Brown | ................... | G01N 23/04 |
| | | | | 378/57 |
| 2016/0187114 A1* | 6/2016 | Burdine | ............... | F42B 23/005 |
| | | | | 102/371 |
| 2016/0282098 A1* | 9/2016 | Flynn | ................... | G06K 9/6267 |
| 2017/0299964 A1* | 10/2017 | Manz | ....................... | G03F 7/30 |

OTHER PUBLICATIONS

GB Intellectual Property Office Search Report under Section 17(5) received for GB Patent Application No. 1316508.9 dated Mar. 17, 2014. 3 pages.

Extended European Search Report received for EP Patent Application No. 13275221.3 dated Feb. 7, 2014. 6 pages.

International Preliminary Report on Patentability received for Patent Application No. PCT/GB2014/052797, dated Mar. 31, 2016. 7 pages.

\* cited by examiner

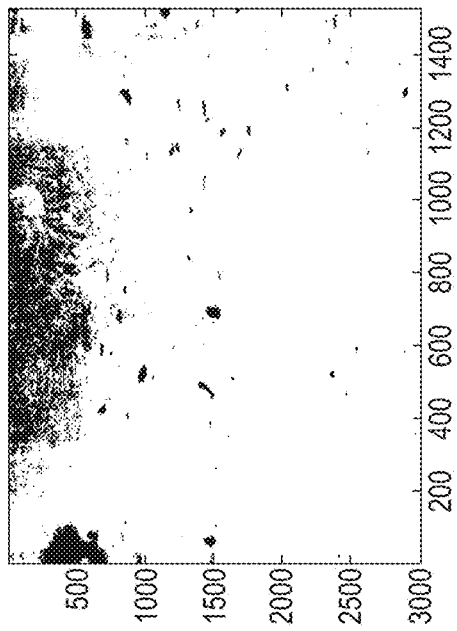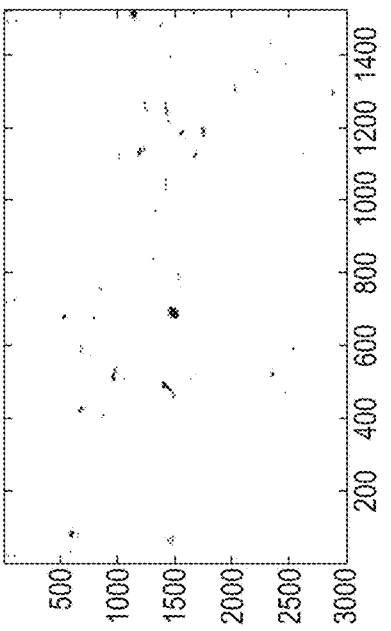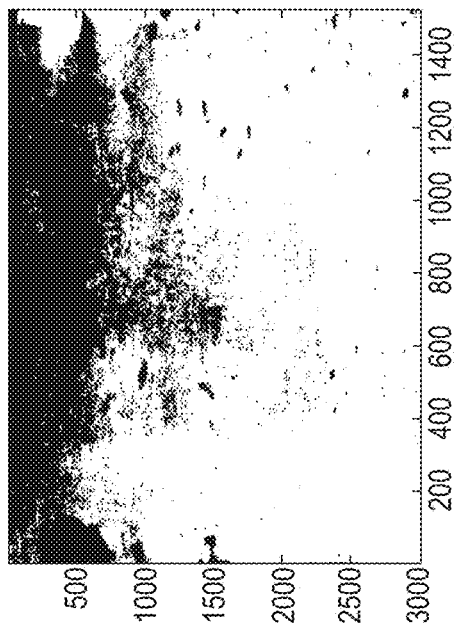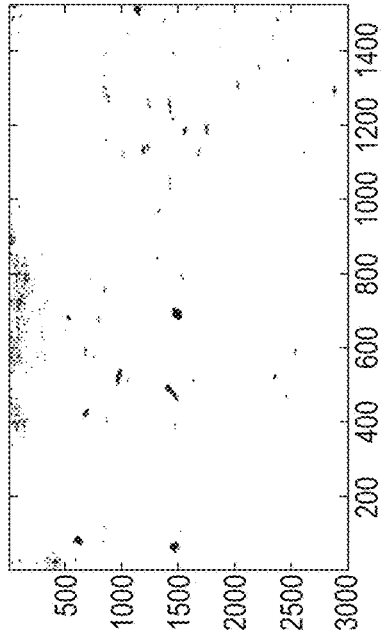

METHOD AND APPARATUS FOR CHARACTERISING FRAGMENTATION OF AN EXPLOSIVE DEVICE

FIELD OF THE INVENTION

The present invention concerns the characterisation of fragmentation of an explosive device. More particularly, but not exclusively, this invention concerns using witness plates to determine properties of fragments generated by explosion of an explosive device.

BACKGROUND OF THE INVENTION

Development of explosive devices, and development of protective measures against their effect, involves an understanding of the behaviour of the device as it explodes. Most explosive weapons generate fragments, which are one of the principal means by which the weapon causes damage. It is therefore desirable to understand the nature and behaviour of the fragments generated by an explosive device as it explodes. For example, understanding the behaviour of fragments close to the explosion helps the analyst to understand the likelihood of the explosion causing collateral damage, i.e. damage other than damage to its intended target. Understanding that likelihood and the behaviour of the fragments helps the analyst to change the design of the explosive device in order to reduce the risk of collateral damage. More generally, understanding the behaviour of the fragments helps the analyst to change the design of the explosive device in order to better control that behaviour.

The principal method presently employed to characterise the fragmentation uses strawboards. Strawboards are large blocks of a material of known shape, density and mass. Strawboards have been used since at least the 1950s to understand energy levels in fragmentation. In a typical assessment, strawboards are arranged around the explosive device. The device is detonated, sending fragments at high velocities into the strawboards. The fragments penetrate the strawboard material. The depth of penetration depends principally upon the kinetic energy of the fragment; knowledge of the depth of penetration enables the energy lost from the fragment in reaching that position to be calculated, and hence the original kinetic energy of the fragment to be deduced. After the explosion, an investigator carefully breaks up the strawboard material and records the position (including the depth) of all fragments in the material. The recorded positions, together with knowledge of the position and orientation of the strawboards themselves, is used to infer the distribution of fragments arising from the explosion. Information regarding the mass and form of each fragment can be inferred, as well as knowledge of the direction in which it was ejected from the explosive device. That enables a map of the distribution of mass and energy from the explosion to be calculated.

However, use of strawboards can be problematic. For example, the impact of a fragment on the strawboard can cause the fragment itself to break into smaller fragments. "Strike Line" analysis of the smaller fragments is then required: fragments with final resting positions in the strawboard that are approximately along a line are assumed to have come from a single original fragment. Also, the strawboard material itself is dense and if knocked can be easily damaged. Material can be lost, or not retained, during—or after—the explosion. The fragmentation analysis requires the strawboard packs to be dismantled and the fragments carefully picked out, which is a labour-intensive process, costly in time and resources. There are also Health and Safety issues associated with manual handling of strawboards/packs.

Witness plates are a known alternative to using strawboards for analysis of fragmentation of an explosive device. A witness plate is a sheet of metal. Like the strawboard, witness plates are positioned around the explosive device, at known locations and orientations, and the device exploded. Fragments from the explosion penetrate or perforate the plate. The thickness and material properties of the plate are known, and so the energy required to penetrate or defeat (i.e. perforate) it can be calculated. That required energy provides a minimum, threshold, kinetic energy for the fragment doing the penetration. From the position and orientation of the witness plate, and of the penetration hole on the witness plate, the direction of ejection of the fragment penetrating the plate can be calculated. Thus, a survey of the position of all of the holes in all of the witness plates can be used to calculate a minimum threshold map of the energy distribution of the fragments generated by the explosion. Repeating the experiment using witness plates of different thicknesses, and hence different threshold energies for penetration, enables a full distribution of mass and energy from the explosion to be calculated.

However, it will be appreciated that, although noting the locations of penetration holes is less onerous than dismantling a strawboard, it is still labour-intensive, and the need for repeated experiments results in prior-art use of witness plates being time consuming and costly. Manual measurement and transcription of data requires handling and manipulation of plates with potentially sharp edges. Accuracy can be limited where plate damage has occurred that has resulted in curvature or other distortion.

It is also known to measure the strike position of fragments ejected by a test warhead specifically designed to eject fragments for measurement and assessment purposes. Such pre-formed, "fixed mass", fragmenting systems can be used to generate highly accurate positional data which, when combined with the relevant associated velocity characteristics, offers precise characterisation of energy across the fragment beam. Precision controlled warheads can produce such an output, which results in uniform damage area per strike; however, naturally fragmenting systems break into fragments that are irregular in mass, form and in the area over which they cause damage. It would be advantageous to be able to characterise irregular fragmentation.

The present invention seeks to mitigate the above-mentioned problems. Alternatively or additionally, the present invention seeks to provide an improved method and apparatus for characterising fragmentation of an explosive device.

SUMMARY OF THE INVENTION

The present invention provides, according to a first aspect, a method of characterising fragmentation of an explosive device, the method comprising:
   (i) receiving an image of a witness plate that has been subject to impact by fragments from explosion of the device;
   (ii) warping the image to remove deformations of the plate within the image;
   (iii) marking strike damage sites caused by impact of the fragments; and
   (iv) recording the position and area of each of the the strike damage sites.

The invention relates to a technique for photo-analysis of witness plate damage. The inventors have realised that the area of damage done by a fragment is indicative of the kinetic energy of the fragment striking the witness plate. In the case of a side-on impact (i.e. a glancing impact), the shape of the damage site can also provide information concerning the properties of the fragment causing the damage. It is not necessary to calculate the precise shape of a fragment to infer useful information about it from the size and shape of the damage it causes.

The method makes use of witness plates, which can be relatively lightweight, recyclable and cost effective, compared with strawboards. The witness plates may be steel witness plates. The method enables trials of explosive devices to be carried out with reduced physical handling, time and effort compared with strawboard trials, improving turn-round time for design and test teams and reducing exposure to potential injury or harm. The method also enables a significant improvement in the fidelity of the results obtained, whilst reducing the time required for assessment.

Compared with prior-art use of strawboards and witness plates, this method enables much quicker and more accurate analysis of fragmentation in an explosion. Analysis of a photograph of the witness plate means that many fragment impacts can be processed simultaneously, resulting in very significant time savings. The method enables the investigator to analyse a great deal of information quickly, and have confidence in the answers. In contrast to prior-art methods, which, due to the effort required to gather data, typically provided only a small amount of data, the method of the invention can be used to obtain a great deal of data on the fragment impacts. Example embodiments of the invention can be much less sensitive to the complexity of data than are prior-art methods, as substantially all fragment strikes, of whatever kind, can be captured and processed.

Prior-art methods typically require many hours of measurement (typically several man-weeks, to retrieve the fragments from the strawboard arena, resulting in assessment of a single experimental sequence potentially lasting several man-months). There is also a significant risk of human error. Methods according to example embodiments of the present invention can be carried out far more quickly. Indeed, it may be that the method is completed sufficiently quickly that it can be repeated immediately, for example to check the results. For example, it may be that the method is completed on the same day as, or even within an hour of, the explosion. It may be that the method includes the step of providing a further explosive device having a design that has been altered in view of the results of the first carrying out of the method and repeating the method using the further explosive device. Such "live" alteration of trials is not possible using prior-art methods.

Also, there are far fewer opportunities for human error. The same technique can be used for different plates, resulting in greater consistency of results.

Advantageously, there is no need to measure the plates directly. All of the strike damage sites may be used in inferring properties of the explosive output, including, for example, performance factors such as fragment density in pre-defined angular zones.

It may be that the method includes the steps involved in generating the images. For example, the method may include providing the plurality of witness plates at known locations around the explosive device. It may be that the method includes the step of exploding the device. It may be that the method includes photographing the witness plates.

It may be that the method further comprises inferring the size of one or more, or preferably all, of the fragments from the recorded positions and areas, optionally also using information from other sources.

Information regarding the size of the strike damage sites may, for example, be used to identify fragments that are the result of a larger fragment initially generated in the explosion breaking up during flight. That is indicated by the present of strike damage sites of a smaller size than would otherwise be expected.

It may be that the method further comprises calculating the ratio of the number of strike damage sites having an area greater than a selected value to the number of strike damage sites having an area less than the selected value.

It may be that the method further comprises categorising the strike damage sites into families, e.g. a plurality of families each comprising all strike damage sites falling within a respective strike damage sites size range.

It may be that the method further comprises recording the shape of each of the strike damage sites. For example, the method may include recording the length of a major and a minor axis of each of the strike damage sites.

It may be that the method further comprises inferring the direction of fragment flight from the recorded position and area, optionally also using information from other sources.

It may be that the method further comprises inferring the type of fragment from the recorded position and area, optionally also using information from other sources.

It may be that the method further comprises inferring the power distribution of fragment from the inferred sizes and directions, optionally also using information from other sources.

It may be that the method further comprises using information from other sources in characterising the fragments. For example, an x-ray photograph of the explosive device taken as the device explodes can provide information concerning the initial break-up of the device, and that information concerning the initial break-up can provide information for example about the likely initial size and direction of flight of fragments. By combining information derived from the witness plates with information from other sources, families of the fragments may be identified.

It may be that the witness plates are of a standard size, for example 1 m×2 m.

The impact of the fragments will typically result in deformation of the plate, and so the method includes the step of warping the image to remove those deformations.

The method may include the step of selecting the area of the image corresponding to the witness plate and remapping it to its original shape. (For example, for a 2 m×1 m witness plate, the area of the image corresponding to the witness plate may be remapped to 2000×1000 pixels, so that each pixel corresponds to a 1 mm×1 mm square of the witness plate surface.) The location of the fragment impacts may then be calculated directly from the co-ordinates of the pixels corresponding to them.

It may be that the method includes the step of characterising the strike damage sites by thresholding the image. It may be that the step of characterising the strike damage sites by thresholding the image comprises the steps:

(a) setting a threshold;
(b) identifying pixels in the warped image of the witness plate at which the image intensity exceeds the threshold.

It may be that the threshold is set by an operator.

It may be that the positions are identified by a computer.

It may be that the method includes calculating the position, in the warped image, of a centroid of the area of a strike damage site. It may be that the method includes calculating the polar co-ordinates of the centroid relative to the position of the explosive device.

It may be that the step of warping the image to remove deformations of the plate comprises providing reference markers having known relative positions on the witness plate, identifying the reference markers on the photograph of the witness plate, and calculating the transformation necessary to restore the reference markers to the known relative positions in the photograph of the witness plate.

It may be that the method comprises the step of calculating how much work has been done by each fragment in striking the witness plate.

The method may be used to re-interpret old photographs of witness plates.

A second aspect of the invention provides a computer program product configured to carry out the method of the first aspect of the invention.

A third aspect of the invention provides a computer programmed to carry out the method of the first aspect of the invention.

It will of course be appreciated that features described in relation to one aspect of the present invention may be incorporated into other aspects of the present invention. For example, the computer program product of the third aspect of the invention may incorporate any of the features described with reference to the method of first aspect of the invention, and vice versa.

DESCRIPTION OF THE DRAWINGS

Embodiments of the present invention will now be described by way of example only with reference to the accompanying schematic drawings of which:

FIG. 4 shows marked strike damage sites in a cleaned, transformed image of a damaged witness plate, at four different levels of thresholding.

DETAILED DESCRIPTION

Example embodiments of the invention provide an automated or semi-automated method of analysing fragmentation damage on a witness plate. In these examples, the analysis is carried out by automatic gathering of data by a computer rather than by a human performing a qualitative assessment of the damage and transcribing its details manually. Consequently, the analysis can be carried out far more quickly than in prior-art methods. Much of the process is performed in software: importation of images of the damaged witness plate; restitution to reference form (i.e. warping the image to its original undistorted shape, and mapping the warped image to a size that provides a desired ratio of pixel count to length in the original witness plate); thresholding for identification of strikes; determination of the position of a centroid for each strike and the area of each strike (the latter providing an indication of the work done by the fragment on the plate during the strike), and transformation to polar co-ordinates. A key performance output for an explosive device—fragmentation—can thereby be readily and quickly assessed for any explosive charge.

This approach can save significant time and effort over conventional techniques, in post-processing the trial data. Example embodiments of the invention can provide results in minutes as opposed to the man-months of effort currently required to generate initial data.

Figure 1:
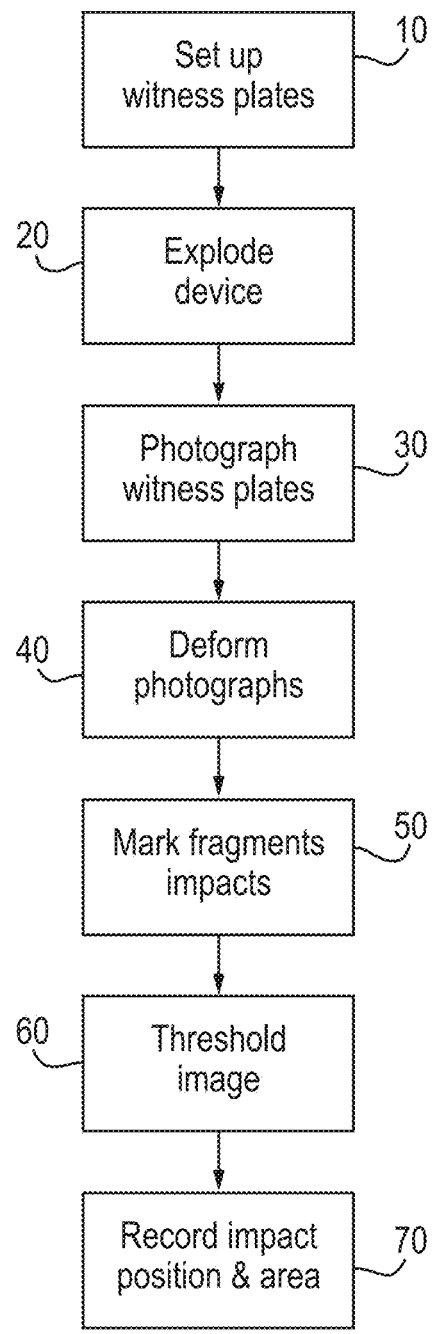
FIG. 1 is a flow chart of an example method according to the invention.
Figure 2:
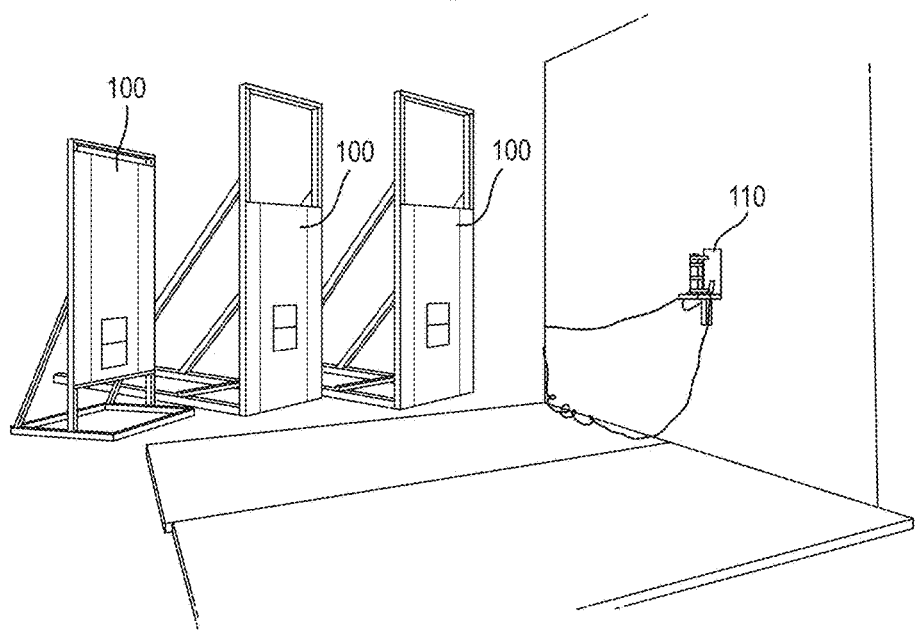
FIG. 2 shows witness plates surrounding the site of an explosion in a method according to an example embodiment of the invention.

In an example method of an embodiment of the invention, 2 mm steel witness plates 100 are set up (FIG. 1, step 10; FIG. 2) in fixed locations in the vicinity of an explosive device 110, to sample the fragment swath. The plates 100 are placed at varying stand-offs to assess variation in angular throw and effects of range of fragment defeat capability. The witness plates 100 have a known size (in this example 2 m by 1 m) and are positioned at known range and angle to the generating charge.

The explosive device 110 is detonated (step 20).

The first task for the example method is to determine the position and size of the strike damage sites resulting from fragments of the explosive device, and to record those data in tabular form for use in trials data reports and design evaluation.

Figure 3A:
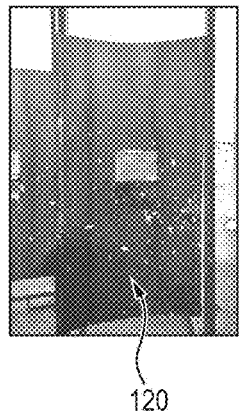
FIG. 3 shows (a) a photograph of one of the witness plates of FIG. 2 after detonation of the explosion, (b) the photograph of (a) after an image transformation, (c) the transformed photograph of (b) with fragment strike damage sites marked, and (d) the marks of FIG. (c) in an image from which the background plate has been removed.

The witness plates 100, damaged by the explosion, are photographed (step 30; FIG. 3(a)), the images showing strikes 120 on the witness plate 100 caused by the impact of fragments from the explosion. A range of photographs are prepared, including both front and rear views of the plates.

Figure 3B:

Each photograph is provided as a JPEG image (or other suitable readable format) to a computer running image-processing software. The image is adjusted for intensity. The image processing software warps the photograph (step 40; FIG. 3(b)) to eliminate distortions resulting from distortions of the plate caused by the explosion, and to map the image of the plate 100 back to the original dimensions of the plate 100, in this example, by ensuring a ratio of 2:1 in the image size. The resulting data is stored as a JPEG file with a fixed pixel count (2000 by 1000) allowing direct mapping of position and area from pixel co-ordinates to mm.

Figure 3C:
Figure 3D:
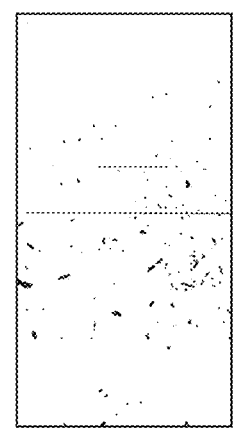

The JPEG file is further processed by image-processing software. The software automatically marks the strikes 120 with highlights 130 (step 50; FIG. 3(c)). (In alternative example embodiments, the marking of the strike damage sites 120 with highlights 130 may be carried out manually by an operator.) Thresholding is applied to the photograph, to remove unnecessary image data by removing the background by removing pixels having an intensity less than a selected value, leaving only the highlights 130 visible in the image (step 60; FIG. 3(d)). The damage to the witness plates 100 is analysed by the software, to generate data on the position and area of the strike highlights 130. The position of the strike highlight 130 is considered to be the position of the centroid of the highlighted area; the position of the centroid is therefore calculated for each strike damage site. The software records the position (i.e. co-ordinate on the plate) and area of each strike highlight 130 (step 70). (As the number of pixels is chosen to provide a simple ratio to the actual size of the plate, the pixel co-ordinates provide a direct indication of the co-ordinates of the centroid on the plate.) The position of each centroid is recalculated, using knowledge of the position and location of the plate, into spherical co-ordinates centred on the position of the explosive device at detonation. Use of those spherical co-ordinates enables direct combination and comparison of results from all of the plates 100, providing a good representation of the angular distribution of fragments in the explosion and the drop in density of strikes with increasing range. In this example, the output is generated as a simple table of results. The area of the damage caused by the strike and the position of the strike damage site (together with the position and orientation of the witness plate) are used to determine the kinetic energy of the fragments generated in the explosion, as a function of angle.

Results are generated in minutes, as opposed to several hours for conventional assessment of strike points only. The resulting data offers a greater understanding of fragmentation performance than prior-art methods, enabling an improved understanding of product output and sensitivity to changes in associated processes.

An example of a photograph of a witness plate which has been thresholded at four different levels is shown in FIG. 4(*a*) to (*d*). The threshold is at its lowest value in FIG. 4(*a*) and increases by equal amounts to its highest value in FIG. 4(*d*).

Figure 5A:
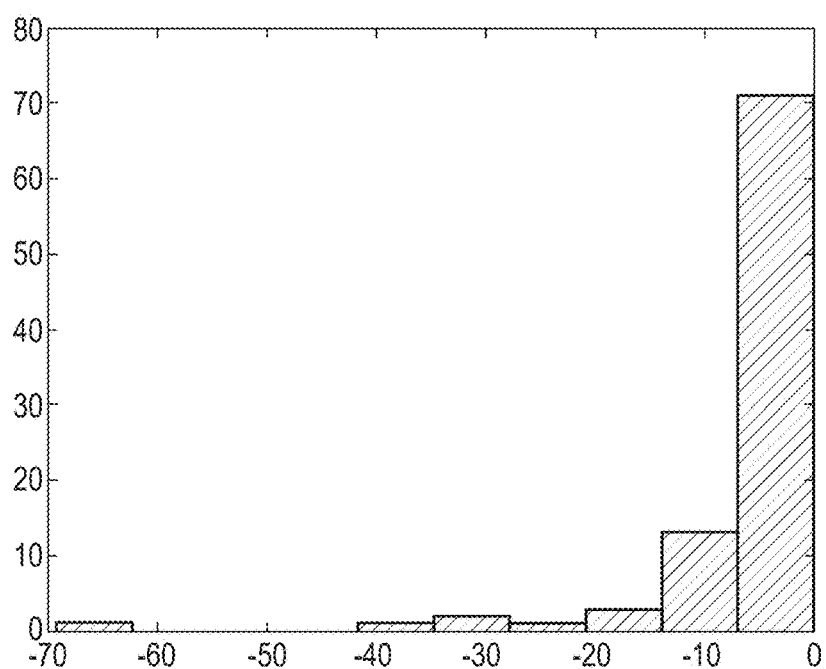
FIG. 5 shows (a) a histogram showing the distribution of strike damage site sizes and (b) the marked strike damage sites from which the distribution of (a) was obtained.
Figure 5B:
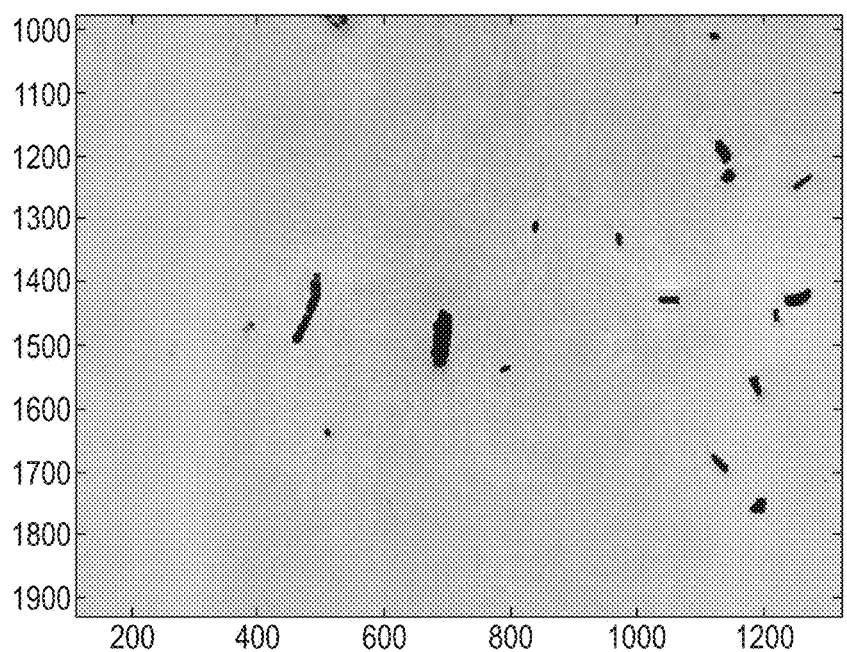

In some example embodiments of the invention, a statistical analysis of the distribution of strike damage sites is carried out. For example, FIG. 5(*a*) is a histogram showing the distribution of strike damage site sizes in the image of FIG. 5(*b*).

Example embodiments of the invention provide a highly accurate, fast and repeatable process, regardless of the number or complexity of strikes, and using standard still photographs. That offers a higher-fidelity assessment of performance than has previously been possible, improving experimental confidence in comparative trials.

We have tested the output of trial runs of example embodiments of the invention against results obtained by prior-art methods. The tests confirm that the approach described above provides a high level of accuracy.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of characterising fragmentation of an explosive device, the method comprising:
  receiving, by a processor, an image of a witness plate that has been subject to impact by fragments from explosion of the device, the image including a plurality of pixels;
  mapping, by the processor, coordinates of each pixel in the image to a location on the witness plate;
  warping, by the processor, the image to remove deformations of the plate within the image to produce a warped image of the witness plate;
  marking, by the processor, coordinates of each pixel representing strike damage sites in the warped image caused by impact of the fragments;
  recording, by the processor, the position and area of each of the marked strike damage sites in the warped image based on the coordinates of each pixel representing the marked strike damage sites;
  calculating, by the processor, at least one location of fragment impact on the witness plate from the coordinates of the pixels corresponding to the recorded position and area of each of the marked strike damage site; and
  generating, by the processor, a table of results based on the at least one calculated location of fragment impact.

2. The method of claim 1, including the preliminary steps of providing the plurality of witness plates at known locations around the explosive device, exploding the device and photographing the witness plates.

3. The method of claim 1, including providing a further explosive device having a design that has been altered in view of the results of a first carrying out of said method and repeating said method using the further explosive device.

4. The method of claim 1, further comprising inferring the size of one or more of the fragments from the recorded positions and areas.

5. The method of claim 1, further comprising calculating the ratio of the number of strike damage sites having an area greater than a selected value to the number of strike damage sites having an area less than the selected value.

6. The method of claim 1, further comprising categorising the strike damage sites into families.

7. The method of claim 1, further comprising recording the shape of each of the strike damage sites.

8. The method of claim 1, further comprising inferring the direction of fragment flight from the recorded position and area.

9. The method of claim 1, further comprising inferring the type of fragment from the recorded position and area.

10. The method of claim 1, including characterising the strike damage sites by thresholding the image.

11. The method of claim 1, in which the recorded position is the position, in the warped image, of the centroid of the area of the strike damage site.

12. The method of claim 11, further including calculating the polar co-ordinates of the centroid relative to the position of the explosive device.

13. The method of claim 1, wherein warping the image to remove deformations of the plate comprises providing reference markers having known relative positions on the witness plate, identifying the reference markers on the image of the witness plate, and calculating the transformation necessary to restore the reference markers to the known relative positions in the image of the witness plate.

14. The method of claim 1, further comprising calculating how much work has been done by each fragment in striking the witness plate.

15. A non-transitory computer program product encoded with instructions that when executed by one or more processors cause a process to be carried out for characterising fragmentation of an explosive device, the process comprising:
  receiving an image of a witness plate that has been subject to impact by fragments from explosion of the device, the image including a plurality of pixels;

mapping coordinates of each pixel in the image to a location on the witness plate;

warping the image to remove deformations of the plate within the image to produce a warped image of the witness plate;

marking coordinates of each pixel representing strike damage sites in the warped image caused by impact of the fragments;

recording the position and area of each of the marked strike damage sites in the warped image based on the coordinates of each pixel representing the marked strike damage sites;

calculating at least one location of fragment impact on the witness plate from the coordinates of the pixels corresponding to the recorded position and area of each of the marked strike damage site; and generating a table of results based on the at least one calculated location of fragment impact.

16. The computer program product of claim 15, the process further comprising at least one of:

inferring the size of one or more of the fragments from the recorded positions and areas;

calculating the ratio of the number of strike damage sites having an area greater than a selected value to the number of strike damage sites having an area less than the selected value;

categorising the strike damage sites into families;

recording the shape of each of the strike damage sites;

inferring the direction of fragment flight from the recorded position and area;

inferring the type of fragment from the recorded position and area; and characterising the strike damage sites by thresholding the image.

17. The computer program product of claim 15, in which the recorded position is the position, in the warped image, of the centroid of the area of the strike damage site.

18. The computer program product of claim 17, the process further including calculating the polar co-ordinates of the centroid relative to the position of the explosive device.

19. The computer program product of claim 15, wherein warping the image to remove deformations of the plate comprises providing reference markers having known relative positions on the witness plate, identifying the reference markers on the image of the witness plate, and calculating the transformation necessary to restore the reference markers to the known relative positions in the image of the witness plate.

20. A computer comprising the computer program product of claim 15.

* * * * *